(12) United States Patent
Ozawa (10) Patent No.: US 9,025,870 B2
(45) Date of Patent: May 5, 2015

(54) IMAGE PROCESSING DEVICE CORRECTING COLOR OF BORDER REGION BETWEEN OBJECT AND BACKGROUND IN IMAGE

(71) Applicant: Brother Kogyo Kabushiki Kaisha, Nagoya-shi, Aichi-ken (JP)

(72) Inventor: Ryohei Ozawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 118 days.

(21) Appl. No.: 13/797,189

(22) Filed: Mar. 12, 2013

(65) Prior Publication Data
US 2013/0322747 A1 Dec. 5, 2013

(30) Foreign Application Priority Data

May 31, 2012 (JP) .................................. 2012-125370

(51) Int. Cl.
| G06K 9/00 | (2006.01) |
| G06K 9/34 | (2006.01) |
| G06K 9/40 | (2006.01) |
| G06K 9/46 | (2006.01) |
| H04N 1/58 | (2006.01) |
| H04N 1/62 | (2006.01) |

(52) U.S. Cl.
CPC ................ *G06K 9/4652* (2013.01); *H04N 1/58* (2013.01); *H04N 1/62* (2013.01)

(58) Field of Classification Search
None
See application file for complete search history.

(56) References Cited

U.S. PATENT DOCUMENTS

| 5,475,507 A * | 12/1995 | Suzuki et al. .................. 358/500 |
| 6,873,441 B1 | 3/2005 | Kuwabara et al. |
| 7,013,043 B2 * | 3/2006 | Kashioka ....................... 382/167 |
| 7,095,889 B2 * | 8/2006 | Kashioka ....................... 382/164 |
| 2001/0033399 A1 * | 10/2001 | Kashioka ....................... 358/518 |
| 2005/0212726 A1 * | 9/2005 | Namba et al. .................... 345/63 |
| 2006/0023939 A1 * | 2/2006 | Kashioka ....................... 382/162 |

(Continued)

FOREIGN PATENT DOCUMENTS

| EP | 0540313 A2 | 5/1993 |
| JP | 2001-094804 A | 4/2001 |

(Continued)

OTHER PUBLICATIONS

European Patent Office, Extended European Search Report for European Patent Application No. 13158842.8, mailed Jun. 13, 2013.

*Primary Examiner* — Bernard Krasnic
(74) *Attorney, Agent, or Firm* — Merchant & Gould PC (57) ABSTRACT

An image processing device includes a processor and a memory. The memory stores computer-readable instructions therein. The computer-readable instructions, when executed by the processor, causes the image processing device to perform: acquiring image data indicative of an image including an object image and a background image adjacent to the object image, the object image and the background image defining a border region in a border of the object image and the background image; acquiring at least two of a first characteristic value, a second characteristic value, and a brightness of the border region, the first characteristic value relating to a color of the object image, the second characteristic value relating to a color of the background image; and correcting a color of the border region by using the at least two of the first characteristic value, the second characteristic value, and the brightness of the border region.

7 Claims, 7 Drawing Sheets

(56) References Cited

U.S. PATENT DOCUMENTS

2007/0071334 A1    3/2007   Sakaue
2009/0213439 A1    8/2009   Miyamura
2010/0278424 A1*   11/2010   Warner .................. 382/173

FOREIGN PATENT DOCUMENTS

| | | |
|---|---|---|
| JP | 2002-354254 A | 12/2002 |
| JP | 2006-295625 A | 10/2006 |
| JP | 2009-206721 A | 9/2009 |

\* cited by examiner

IMAGE PROCESSING DEVICE CORRECTING COLOR OF BORDER REGION BETWEEN OBJECT AND BACKGROUND IN IMAGE

CROSS REFERENCE TO RELATED APPLICATION

This application claims priority from Japanese Patent Application No. 2012-125370 filed May 31, 2012. The entire content of the priority application is incorporated herein by reference.

TECHNICAL FIELD

The present invention relates to an image processing device.

BACKGROUND

There is a technique known in the art for removing the background color (base color) from a target image represented by image data. One advantage of removing the background color before printing the target image is that less printing agent (ink, toner, or the like) is required for printing the target image than when the background color is not removed.

According to one process of removing the background color from a target image described in the art, an image processor removes parts of the image whose gradation values fall within a specified removal range by converting the colors in these image parts to white, and corrects gradation values that fall within a specified adjustment range near the removal range in order to maintain continuity of tones within the image after the removal process is completed. This process can smooth out differences in gradation levels produced in bordering regions between background images, whose background color has been removed, and object images.

SUMMARY

However, there is room to improve the quality of image parts in border regions between background images and object images in some target images, and there is a need to improve the image quality in these border regions.

In view of the foregoing, it is an object of the present invention to provide an image processor capable of processing an image represented by image data to improve the image quality of border regions between background images and object images.

In order to attain the above and other objects, the invention provides an image processing device including a processor and a memory. The memory stores computer-readable instructions therein. The computer-readable instructions, when executed by the processor, causes the image processing device to perform: acquiring image data indicative of an image including an object image and a background image adjacent to the object image, the object image and the background image defining a border region in a border of the object image and the background image; acquiring at least two of a first characteristic value, a second characteristic value, and a brightness of the border region, the first characteristic value relating to a color of the object image, the second characteristic value relating to a color of the background image; and correcting a color of the border region by using the at least two of the first characteristic value, the second characteristic value, and the brightness of the border region.

According to another aspect, the present invention provides a non-transitory computer readable storage medium storing a set of program instructions executed by a computer. The program instructions comprises: acquiring image data indicative of an image including an object image and a background image adjacent to the object image, the object image and background image defining a border region in a border of the object image and the background image; acquiring at least two of a first characteristic value, a second characteristic value, and a brightness of the border region, the first characteristic value relating to a color of the object image, the second characteristic value relating to a color of the background image; and correcting a color of the border region by using the at least two of the first characteristic value, the second characteristic value, and the brightness of the border region.

According to another aspect, the present invention provides an image processing method executed by an image processing device. The image processing method includes: acquiring, with the image processing device, image data indicative of an image including an object image and a background image adjacent to the object image, the object image and the background image defining a border region in a border of the object image and the background image; acquiring at least two of a first characteristic value, a second characteristic value, and a brightness of the border region, the first characteristic value relating to a color of the object image, the second characteristic value relating to a color of the background image; and correcting a color of the border region by using the at least two of the first characteristic value, the second characteristic value, and the brightness of the border region.

BRIEF DESCRIPTION OF THE DRAWINGS

The particular features and advantages of the invention as well as other objects will become apparent from the following description taken in connection with the accompanying drawings, in which.

DETAILED DESCRIPTION

1. Structure of a Multifunction Peripheral

Next, a multifunction peripheral 200 serving as an image processing device according to an embodiment of the present invention will be described while referring to FIGS. 1 through 9.

Figure 1:
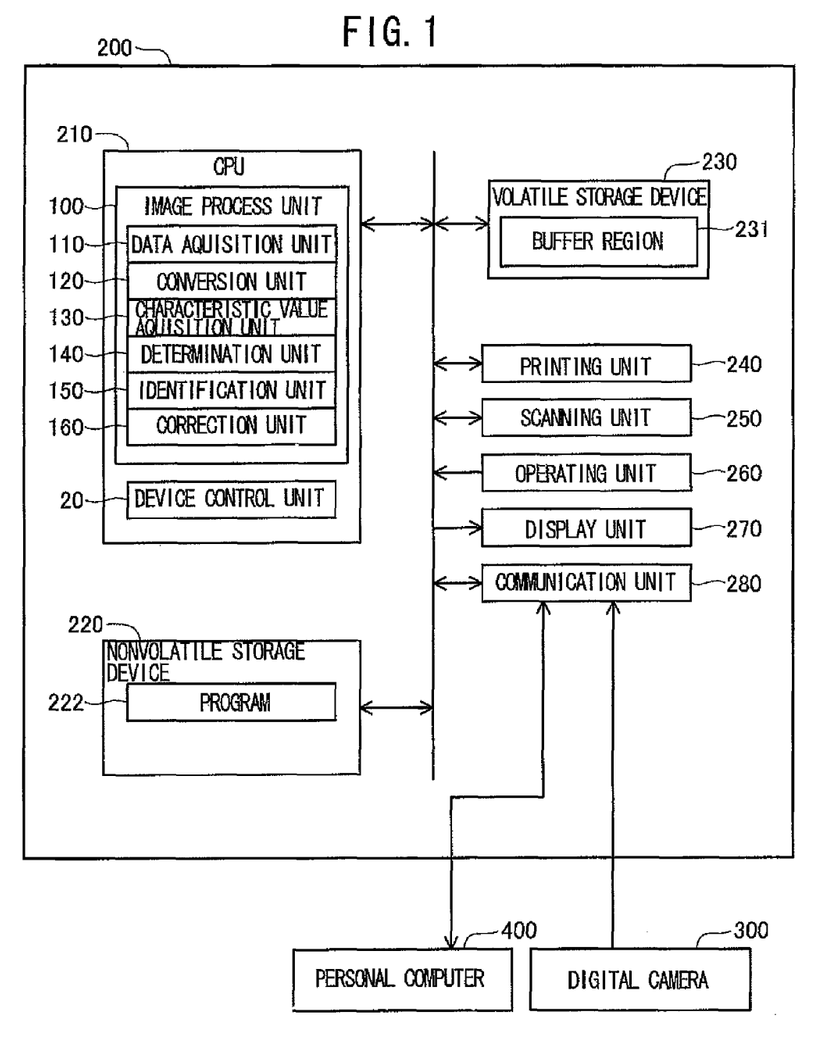
FIG. 1 is a block diagram showing the structure of an image processing device.

The multifunction peripheral 200 includes a CPU 210; a nonvolatile storage device 220, such as a hard disk drive or EEPROM; a volatile storage device 230, such as RAM; a printing unit 240 for printing images using a prescribed system (inkjet or laser, for example); a scanning unit 250 for reading an original using a photoelectric converting element (CCD or CMOS, for example); an operating unit 260, such as a touchscreen and buttons; a display unit 270, such as a liquid crystal panel superimposed by the touchscreen; and a communication unit 280 for communicating and exchanging data with an external device, such as a digital camera 300, a personal computer 400, or USB memory (not shown).

The volatile storage device 230 is provided with a buffer region 231 for temporarily storing various intermediate data generated when the CPU 210 performs processes. The nonvolatile storage device 220 stores computer programs 222 for controlling the multifunction peripheral 200. The computer programs 222 may be supplied on a CD-ROM or other recording format.

By executing the computer programs 222, the CPU 210 functions as an image process unit 100 for executing an image process described below, and a device control unit 20 for controlling the printing unit 240 and scanning unit 250. The image process unit 100 includes an image data acquisition unit 110, a conversion unit 120, a characteristic value acquisition unit 130, a determination unit 140, an identification unit 150, and a correction unit 160.

2. Image Process

The image process unit 100 executes an image process on object images representing objects, such as text, photographs, and drawings, and on image data representing the background of the object images. This image process includes a process for converting color of background image and a process for correcting colors in border regions along the borders between object images and the background images. The image process unit 100 executes this image process on target image data prior to printing after receiving a print command from the user to print an image represented by image data using the printing unit 240, for example. The print command may come in the form of a print job transmitted from an external device, such as the personal computer 400 in FIG. 1, or a copy command instructing the multifunction peripheral 200 to generate image data by reading an original with the scanning unit 250 (scan data) and to print an image based on the scan data.

Image data that can be subjected to the image process of the embodiment (hereinafter referred to as target image data) is image data generated by a device capable of producing images, such as the scanning unit 250 or digital camera 300 (FIG. 1). In the following description of the image process according to the embodiment, the target image data will be assumed to be scan data generated by an image-reading device such as the scanning unit 250 that reads an original depicting objects that are rendered primarily in a single color (text, for example).

Figure 2:
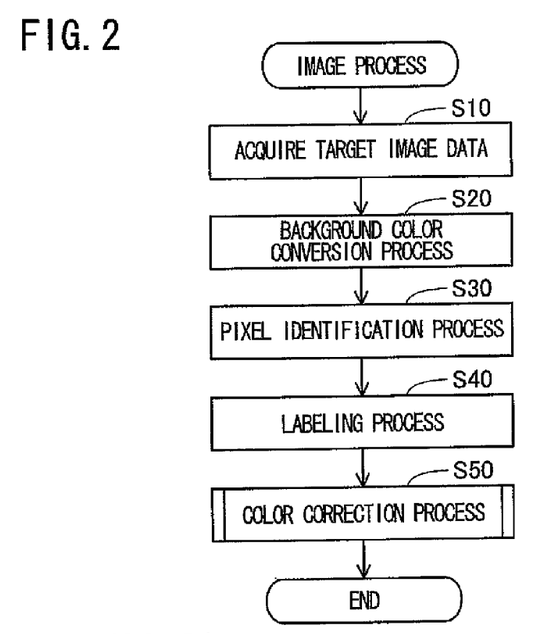
FIG. 2 is a flowchart illustrating steps in an image process executed by the image processing device.

FIG. 2 is a flowchart illustrating steps in the image process. In S10 at the beginning of the image process, the image process unit 100 acquires the target image data. For example, if the image process was initiated in response to a print job transmitted from an external device, the image data acquisition unit 110 acquires image data from the print job (scan data saved on the personal computer 400, for example) as the target image data. Alternatively, if the image process was initiated in response to a copy command, the image data acquisition unit 110 controls the scanning unit 250 to read an original prepared by the user and acquires the resulting scan data as the target image data. In this example, the target image data is RGB data configured of pixel data that includes a component value for each of the RGB components (one of a possible 256 gradation values, for example).

Figure 3A:
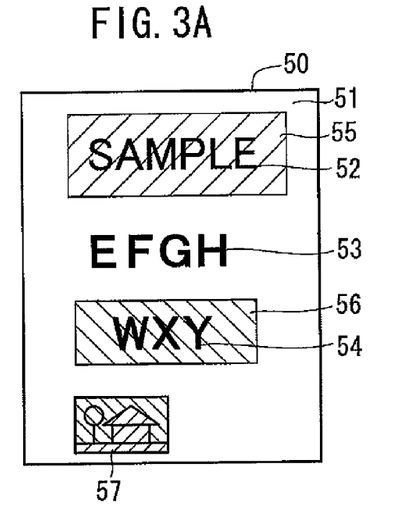
FIGS. 3A and 3B are diagrams showing an example of a target image.

FIG. 3A shows an example of an entire target image 50 represented by the target image data. The target image 50 includes four object images as partial images. The object images include a first text image 52 representing the character string "SAMPLE," a second text image 53 representing the character string "EFGH," a third text image 54 representing the character string "WXY," and a photo image 57. The three text images 52, 53, and 54 are monochromatic images essentially represented by a single color, while the photo image 57 is a multicolor image having a plurality of colors.

In the embodiment, an object image essentially expressed in a single color includes an object rendered in colors sufficiently close to one another as to be perceived as a monochromatic object when observed at a normal observation distance. For example, a text image that is essentially monochromatic includes text rendered in colors sufficiently close to one another as to be perceived to be monochromatic text by an observer viewing the text image with the naked eye at an observation distance typical for reading text. Further, when an original including objects determined to be essentially monochromatic according to the above standard is read by a scanner or other image-reading device to produce scan data, color differences not contained in the original may be introduced in the scan data for object images representing objects, due to reading irregularities. The object images included in the above-described scan data is treated as object images representing objects in essentially a single color.

The target image 50 further includes three background images as partial images. The background images include a first background image 55 representing the background of the first text image 52, a second background image 51 representing the background of the second text image 53 and photo image 57, and a third background image 56 representing the background of the third text image 54. The background images are partial images that neighbor object images and that surround all or part of the object images. Generally, a background is composed essentially of a single color that does not represent a specific object (text, photo, drawing, or the like). The second background image 51 is white in this example, while the first background image 55 and third background image 56 are depicted in colors different from white.

Figure 3B:
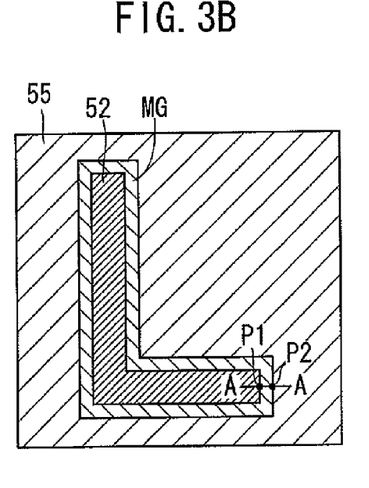

FIG. 3B is an enlarged schematic diagram showing a portion of the first text image 52 (around the letter "L") shown in FIG. 3A. In FIG. 3B, a border region MG is indicated along the border of the first text image 52 and the first background image 55. The border region MG may possess a different color from the colors of the first text image 52 and first background image 55. When reading the target image 50, the image-reading device may introduce intermediate colors in the border region MG due to various reading characteristics of the image-reading device, such as the scanning resolution, scanning speed, and characteristics of its image sensor. Specifically, an image-reading device commonly generates image data based on light received from the original by the image sensor as the image sensor is moved in a sub-scanning direction relative to the original. During this process, the image-reading device produces pixel data for the border region MG based on both light received from the character and light received from the background. Consequently, the color obtained for the border region MG may be a mix of the text color and the background color in the original. For example, if the color of the first text image 52 is black while the color of the first background image 55 is a relatively light red, the color in the border region MG may include a relatively dark red.

In S20 the conversion unit 120 performs a background color conversion process on the target image data. This process is performed to convert the colors of the background images to a specific color expressed by specific values. In the embodiment, the specific color is white, expressed by the RGB values (255, 255, 255).

Since data for each pixel in the target image data includes three component values used in the RGB color space (values for each of the RGB colors), the target image data can be separated into three single-component image data sets, where one set of single-component image data is configured of image data comprising component values for one of the three components. The background color conversion process includes three independently executed component-color conversion processes. That is, the conversion unit 120 independently executes a component-color conversion process using a color conversion table on each of the three sets of single-component image data. Since the component-color conversion processes are executed independently, the conversion unit 120 converts only pixel values in one single-component image data set (R values, for example) during any component-color conversion process, without considering component values of the other sets of single-component image data (the G and B values in this case). The pixel values whose color component value (R, G, B value) falls within a specified range is changed to a specified color component value (255) during each single-component color conversion process.

Figure 4:
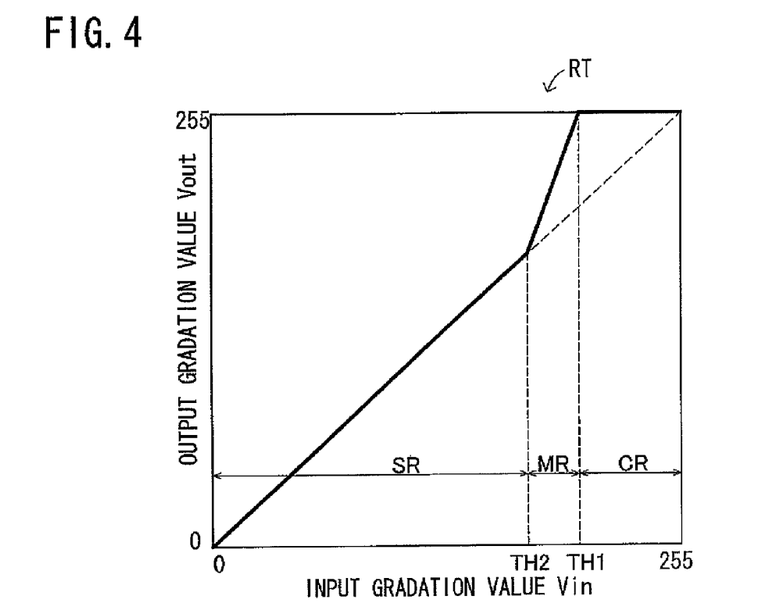
FIG. 4 is a graph showing a sample of color conversion table.

FIG. 4 is a graph of a sample color conversion table RT used in the component-color conversion process. This color conversion table RT changes all output gradation values Vout to the maximum gradation value 255 for all input gradation values Vin within a range CR from a first threshold TH1 to the maximum gradation value (TH1<Vin≤255). The color conversion table RT leaves the output gradation values Vout unchanged for all input gradation values Vin within a range SR from the minimum value (0) to a second threshold TH2 (0≤Vin<TH2). Additionally, the color conversion table RT sets the output gradation values Vout so as to change continuously from the second threshold TH2 to the maximum gradation value of 255 as the input gradation values Vin change from the second threshold TH2 to the first threshold TH1 within a range MR (TH2≤Vin≤TH1). Thus, the color conversion table RT sets the output gradation values Vout to change continuously in response to changes in the input gradation values Vin within the gradation range from before the threshold TH1 to the threshold TH2.

The color conversion table RT in FIG. 4 can be expressed in equation form, as follows.

$V\text{out}=V\text{in}$, if $0 \leq V\text{in} < TH2$.

$V\text{out}=\{(255-TH2)/(TH1-TH2)\} \times (V\text{in}-TH2)+TH2$, if $TH2 \leq V\text{in} \leq TH1$.

$V\text{out}=255$, if $TH1 < V\text{in} \leq 255$.

Using the color conversion table RT described above, the conversion unit 120 executes the component-color conversion process on all pixel values in the single-component image data currently being processed (the target component values for all pixels in the target image 50). The component-color conversion process for each component color may be executed using a common color conversion table RT or using a unique color conversion table specific to the RGB component. For example, the color conversion table RT for each component may have different thresholds TH1 and TH2.

As is typical in most documents, each object image in the target image 50 of FIG. 3 is rendered in a relatively dark color (i.e., a color having relatively small RGB values), while each background image is rendered in a relatively light color (i.e., a color having relatively large RGB values). The background color conversion process is designed for processing image data that represents an image similar to the target image 50. Consequently, the thresholds TH1 and TH2 in the color conversion table RT are set larger than the RGB values anticipated to be pixel values in object images and smaller than the RGB values anticipated to be pixel values in the background images. For example, the first threshold TH1 is set to 210 and the second threshold TH2 to 190.

With this configuration, the background color conversion process can be used to convert colors of background images within an image represented by the image data to a specific color. Thus, when printing an image whose background color is not important, such as a text document, this background color conversion process can be used to convert the background color to white (often referred to as a "background removal process"). By performing this background color conversion process, the image printed based on the resulting image data will require less printing agent (toner, ink, or the like).

Figure 5A:
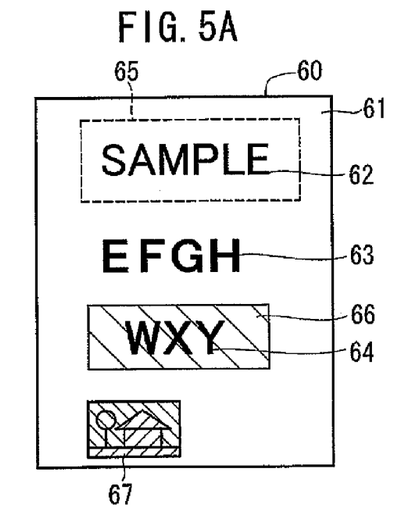
FIGS. 5A and 5B are diagrams showing an example of a converted image to which the target image is converted.
Figure 5B:
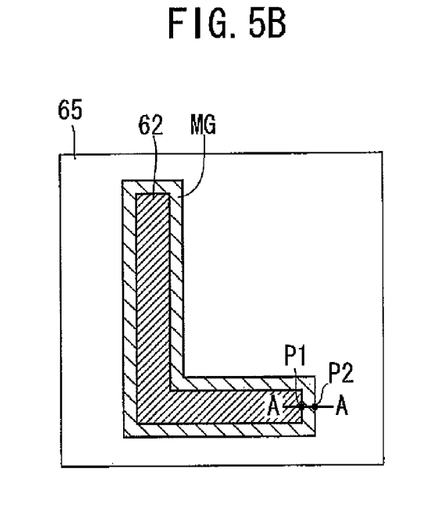

FIGS. 5A and 5B show target image data produced after performing the background color conversion process on the target image data in FIGS. 3A and 3B. In this description, target image data will also be called "converted image data" after it has been subjected to the background color conversion process and "original image data" before it has undergone this process. FIG. 5A shows an entire converted image 60 represented by the converted image data. Here, the leading digit of all reference numerals in FIGS. 5A and 5B for all partial images in the converted image 60 having a correspondence with partial images in the target image 50 of FIGS. 3A and 3B has been changed from "5" to "6", while the last digit remains the same. Further, the names of partial images in the target image 50 are retained for the corresponding partial images in the converted image 60. For example, a first text image 62 and a second text image 63 in the converted image 60 correspond to the first text image 52 and second text image 53 in the target image 50 and, thus, have the same names.

The four object images in the converted image 60 (text images 62, 63, and 64, and a photo image 67) are not modified in the background color conversion process and, thus, retain the same color as in the original image data. However, these object images may include pixels having component values in the range MR that were adjusted with the color conversion table RT. The color of a first background image 65 has been changed to white as a result of all three of its components being set to 255 in the background color conversion process. A third background image 66 has been modified to a color different from white as a result of the background color conversion process because some of the three component values (the R and G values, for example) were set to 255, while the remaining values (the B value, for example) were left unchanged. Background images that have undergone a substantive amount of change, as in the examples of the background images 65 and 66, will be called "converted background images. The color of a second background image 61 is not substantially modified in the background color conversion process and retains its white color. However, any uneven portions (irregular colors) in the second background image 51 of the target image 50 have been removed in the second background image 61 of the converted image 60 through a color conversion process. Background images such as the second background image 61 that are left white, i.e., background images whose colors were not modified in the background color conversion process will be called "preserved background images."

FIG. 5B shows an enlarged schematic diagram around the letter "L" in the first text image 62 and is similar to FIG. 3B. The background color conversion process also preserves the color of the border region MG positioned along the border of the first text image 62 and first background image 65. However, the color of the border region MG may appear unnatural to a viewer of the converted image 60 because the colors in the border region MG may comprise a mix of the background color and the text color in the original, as described above. In the target image 50 of the example of FIG. 3, the color of the first text image 52 is black, and the color of the first background image 55 is a relatively light red. Hence, the border region MG may include a relatively dark red in this example. This dark red color of the border region MG would not likely be noticeable in the target image 50 to a viewer since the color is related to both the black first text image 52 and the light red first background image 55. Thus, in the target image 50, the dark red border region MG would likely appear natural, rather than unnatural, to the viewer. However, the dark red color of the border region MG would be more noticeable in the converted image 60 because it has little connection to the converted color of the first background image 65 (white) and is more likely to give an unnatural impression.

Figure 6A:
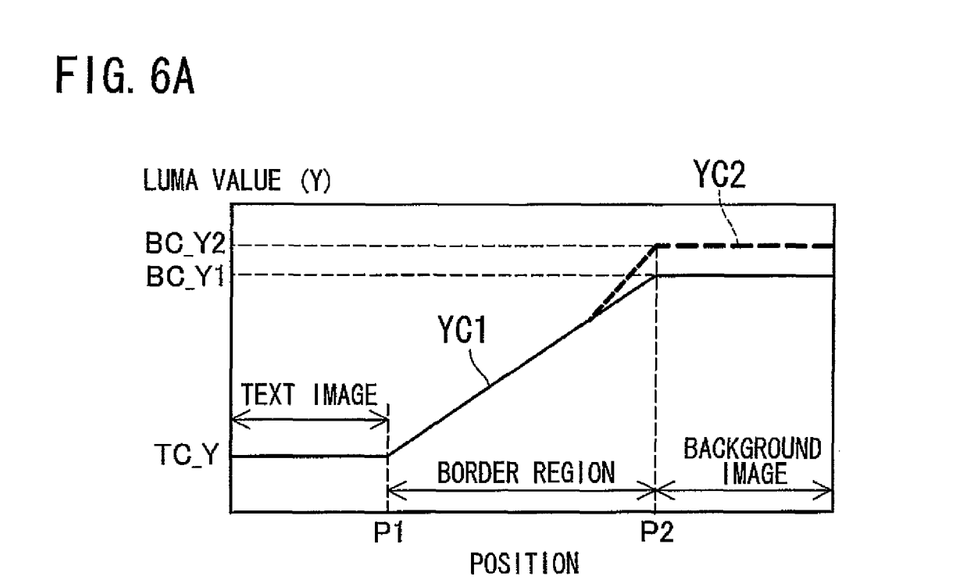
FIG. 6A is a graph showing relationship between positions and luma values.
Figure 6B:
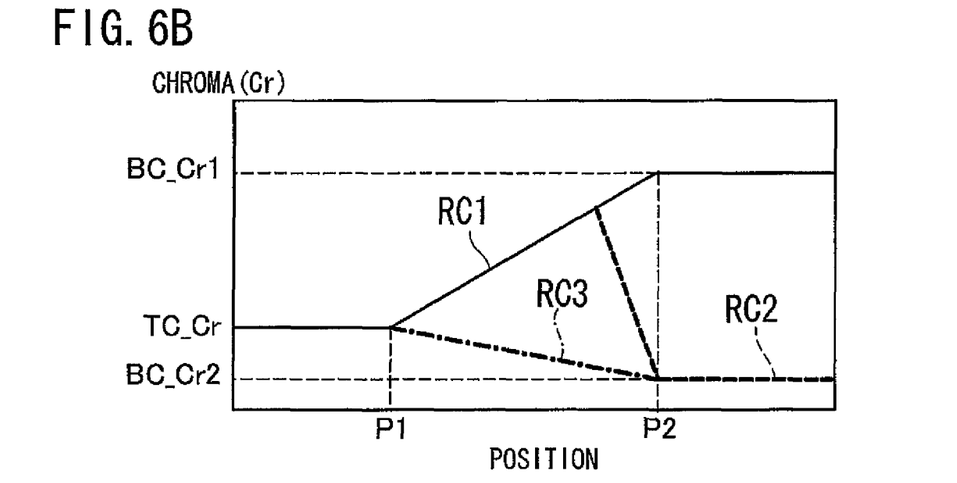
FIG. 6B is a graph showing relationship between positions and chroma values.

FIG. 6 shows values produced by converting colors (RGB values) on the line segment A-A shown in FIGS. 3B and 5B to values in the YCbCr color system. In the graph of FIG. 6A, the solid line YC1 denotes luma values (brightness) Y in the target image 50, and the dashed line YC2 denotes luma values Y in the converted image 60. In the graph of FIG. 6B, the solid line RC1 denotes chroma values Cr in the target image 50, and the dashed line RC2 denotes chroma values Cr in the converted image 60. The dashed lines YC2 and RC2 illustrate only the parts that are different between the converted image 60 and target image 50 (different before and after the background color conversion process). The luma values Y and chroma values Cr in the portion of the converted image 60 not depicted by the dashed lines YC2 and RC2 are equivalent to the luma values Y and chroma value Cr of the target image 50 indicated by the solid lines YC1 and RC1. As will be described later, the chain line RC3 in FIG. 6B denotes chroma values Cr produced by executing a color correction process described later on the converted image 60.

Color values in the YCbCr color space (hereinafter called YCC values) representing colors of an object image in the target image 50, such as the first text image 52, will be given the notation (TC_Y, TC_Cb, TC_Cr) in this description. The colors of an object image in the converted image 60, such as the first text image 62, are identical to the colors of the corresponding object image in the target image 50. YCC values representing the color of a background image in the target image 50, such as the first background image 55, will be expressed with the notation (BC_Y1, BC_Cb1, BC_Cr1). Similar, YCC values expressing the color of a background image in the converted image 60, such as the first background image 65, will be given the notation (BC_Y2, BC_Cb2, and BC_Cr2).

As shown in FIG. 6A, the TC_Y is a nearly constant luma value Y in the first text image 52, which is essentially monochromatic, and the BC_Y1 is a nearly constant luma value Y in the first background image 55, which is essentially monochromatic. In reality, the luma values Y in the first text image 52 and first background image 55 fluctuate due to irregularities, but are depicted as constant values in FIG. 6A to avoid complicating the drawing. The luma value Y in the border region MG is nearly the same as the TC_Y of the first text image 52 at a first position P1 adjacent to the first text image 52 and is nearly the same as the BC_Y1 of the first background image 55 at a second position P2 adjacent to the first background image 55. The luma value Y in the border region MG tends to change between the first position P1 and second position P2 so as to approach the TC_Y as the position between the first position P1 and second position P2 grows closer to the first position P1 and so as to approach the BC_Y1 as the position grows closer to the second position P2. These values do not necessarily change in a straight line, due to irregularity, but are depicted as a straight line in FIG. 6A to avoid complicating the drawing.

The luma values Y in the converted image 60 are identical to those in the target image 50 for the first text image 52, but are a constant value BC_Y2 in the first background image 55. The BC_Y2 is the luma value of white and is greater than BC_Y1. In the border region MG of the converted image 60, the luma value Y begins to separate from the values in the target image 50 near the second position P2 so that the luma value Y is not discontinuous. This occurs because pixel values in the range MR of the color conversion table RT (see FIG. 4) are adjusted in the background color conversion process. Hence, luma values Y in the border region MG are the same in both the converted image 60 and target image 50, except near the second position P2. As with the luma value Y in the border region MG of the target image 50, the luma value Y in the border region MG of the converted image 60 generally changes between the first position P1 and second position P2 so as to approach the TC_Y as the position between the first position P1 and second position P2 nears the first position P1 and so as to approach the BC_Y2 as the position nears the second position P2.

Thus, the trend of change in luma values Y within the border region MG is retained in the converted image 60. The background color conversion process according to the embodiment serves to further increase the luma value Y of the background image (to convert the color to white, for example) when the luma value Y of an object image is relatively low (a dark color) and the luma value Y of the background image is relatively high (a light color). Thus, the amount of change in the luma value Y effected by the background color conversion process is relatively small, and the luma value Y will generally not be a factor in causing the border region MG of the converted image 60 to appear unnatural.

As shown in FIG. 6B, the chroma value Cr of the target image 50 is nearly constant at the TC_Cr in the first text image 52 and is nearly constant at BC_Cr1 in the first background image 55. In reality, as with the luma value Y described above, the chroma values Cr in the first text image 52 and first background image 55 fluctuate due to irregularities, but are depicted as constant values in FIG. 6B. The chroma value Cr in the border region MG of the target image 50 is nearly identical to the chroma value TC_Cr in the first text image 52 at the first position P1 and is nearly identical to the chroma value BC_Cr1 in the first background image 55 at the second position P2. The chroma value Cr of the border region MG has a changing tendency to approach the TC_Cr as the position between the first position P1 and second position P2 nears the first position P1 and to approach the BC_Cr1 as the position nears the second position P2. This changing trend is not necessarily linear, due to irregularities, but is depicted as a straight line in FIG. 6B to avoid complicating the drawing.

The chroma value Cr of the converted image 60 is identical to that in the target image 50 within the first text image 62, but changes to the constant value BC_Cr2 in the first background image 65. In the embodiment, the first background image 65 is white and, thus, BC_Cr2 is "0". Hence, the chroma value Cr is changed considerably in the background color conversion process, as is illustrated in FIG. 6B, when the color of the first background image 55 has a relatively high chroma (when the BC_Cr1 is relatively large).

The chroma value Cr in the border region MG of the converted image 60 begins to change from the value in the target image 50 near the second position P2 to prevent the chroma value Cr from becoming discontinuous. This occurs because pixel values in the range MR of the color conversion table RT (see FIG. 4) are adjusted in the background color conversion process. The chroma values Cr in the border region MG remain unchanged between the target image 50 and the converted image 60, except near the second position P2.

When the chroma value Cr is changed drastically in the background color conversion process, as in the example of FIG. 6B, the changing trend in chroma values Cr within the border region MG described above is interrupted. As shown in the example of FIG. 6B, the chroma value Cr within the border region MG of the converted image 60 approaches the TC_Cr as the position nears the first position P1 and approaches the BC_Cr2 as the position nears the second position P2, and a local maximum exists between the first position P1 and second position P2. This same type of change may also occur with the other chroma value Cb. Consequently, the border region MG of the converted image 60 may include unnatural colors due to the characteristics of the chroma values Cr and Cb. Next, steps in a process for correcting unnatural colors found in the border region MG of the converted image 60 will be described.

Returning to the background color conversion process of FIG. 2, in S30 the identification unit 150 executes a pixel identification process. The pixel identification process serves to identify each of the plurality of pixels in the converted image 60 as one of three types: a converted background pixel, a preserved background pixel, and an object-related pixel. Converted background pixels are those pixels constituting the converted background images described above (the first background image 65 and third background image 66 in the example of FIG. 5A). Preserved background pixels are the pixels constituting the preserved background images described above (the second background image 61 in the example of FIG. 5A). Object-related pixels are pixels constituting the object images described above (images 62, 63, 64, and 67 in the example of FIG. 5A) and the border regions MG neighboring these object images.

More specifically, the identification unit 150 identifies those pixels constituting the converted image 60 that have at least one component value set to 255 from among the three RGB component values. Any component value set to 255 in the identified pixels was either converted to 255 in the background color conversion process (a converted value) or was already set to 255 prior to the background color conversion process (a preserved value). The identification unit 150 can determine whether the component value is a converted value or a preserved value by comparing component values in the target image 50 and converted image 60 for the identified pixel. When the component value is found to be a converted value, the identification unit 150 identifies the pixel that possesses this component value to be a converted background pixel. When the component value is found to be a preserved value, the identification unit 150 identifies the pixel that possesses this component value to be a preserved background pixel. The identification unit 150 identifies all remaining pixels constituting the converted image 60 that have not been identified as converted background pixels or preserved background pixels to be object-related pixels.

In S40 the identification unit 150 executes a labeling process to assign identifiers (numbers) to the three types of pixels identified in S30. First, the identification unit 150 labels preserved background pixels with a "0" and converted background pixel with a "1". Next, the identification unit 150 groups together pluralities of contiguous object-related pixels and assigns the same identifier to pixels within each distinct group (a natural number of at least 2 and no greater than (N+1), where N is the number of groups). With this step, the identification unit 150 has identified N process regions, a process region being a region that includes an object image and a border region MG. Hence, based on the example in FIG. 5A, the identification unit 150 identifies thirteen process regions corresponding to the thirteen characters in text images 62, 63, and 64 (SAMPLE, EFGH, and WXY) and one process region corresponding to the photo image 67.

Figure 7:
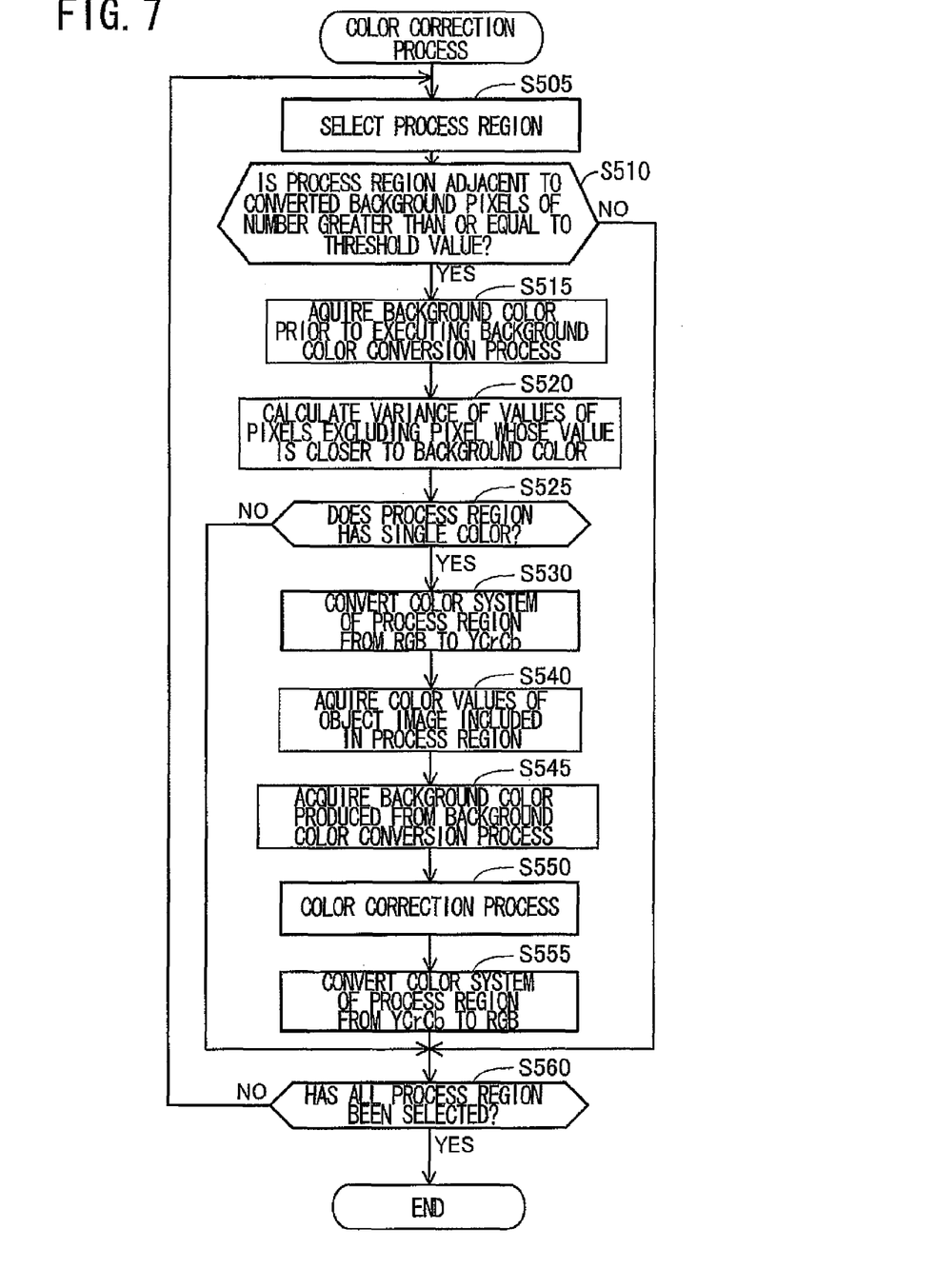
FIG. 7 is a flowchart illustrating steps in a color conversion process executed by the image processing device.

In S50 the image process unit 100 executes a color correction process. FIG. 7 is a flowchart illustrating steps in the color correction process. In S505 the image process unit 100 selects one process region. In S510 the determination unit 140 determines whether the selected process region is adjacent to converted background pixels of a number greater than or equal to a threshold value. If the process region does not neighbor a number of converted background pixels greater than or equal to the threshold value (S510: NO), the image process unit 100 skips to S560 without performing color correction on the currently selected process region. In other words, there is little need to perform color correction on a process target that does not neighbor converted background pixels of a number greater than or equal to the threshold value, because the border region MG will not appear unnatural due to modification of the color in the adjacent background image. In the example of FIG. 5, process regions that include images representing each of the characters in the second text image 63 of the converted image 60 (E, F, G, and H) are not subjected to color conversion.

However, if the selected process region is adjacent to converted background pixels of a number greater than or equal to the threshold value (S510: YES), then in S515 the correction unit 160 of the image process unit 100 identifies and acquires the background color value prior to executing the background color conversion process (hereinafter referred to as the "original background color value"). More specifically, the correction unit 160 identifies a peripheral region in the target image 50 that surrounds the process region and calculates the average value of pixels in this peripheral region to be the original background color value. Here, the width of the peripheral region is set to the size of a prescribed number of pixels (one pixel, for example). The original background color value is expressed using RGB values, for example, using the notation (Rbg, Gbg, Bbg).

In S520 the correction unit 160 calculates the variance of pixel values in the process image. All pixels constituting the process region are used for calculating this variance, excluding those pixels with RGB pixel values expressing a color closer to the original background color value than a reference value (hereinafter called "near-background pixels"). Pixels excluded from this calculation have pixel values that satisfy all expressions (1)-(3) below, for example.

$$Rbg-TH4<R<Rbg+TH4 \quad (1)$$

$$Gbg-TH4<G<Gbg+TH4 \quad (2)$$

$$Bbg-TH4<B<Bbg+TH4 \quad (3)$$

The objective of this step is to calculate the variance of pixel values in object pixels of the process region. Since the process region includes the border region MG in addition to the object image, pixels constituting the border region MG are preferably excluded from the variance calculation. Therefore, near-background pixels are excluded from those pixels used in calculating the variance in this process because it is likely that the border region MG has a color approaching the original background color value. The variance is calculated for each of the three components in this step, for example.

In S525 the determination unit 140 determines whether the process region has essentially-single color based on the calculated variances. For example, the determination unit 140 determines that the process region is essentially monochromatic (single color) when the variance values (σ_R, σ_G, σ_B) calculated for all three components are no greater than the corresponding Threshold values (TR, TG, TB) and determines that the process region is essentially not monochromatic (single color) when at least one of the three variance values exceeds the corresponding threshold value. Since pixels in an image having multiple colors take on RGB values spanning a relatively large range within the possible range, at least one variance among the variance values (σ_R, σ_G, σ_B) is relatively large. In contrast, pixels in an image that is substantially monochromatic have values spanning a relatively small range and, hence, the variance values (σ_R, σ_G, σ_B) are relatively small. Therefore, by setting suitable threshold values (TR, TG, TB), it is possible to make an appropriate determination as to whether the process image has the essentially-single color. For example, the photo image 67, which generally includes multiple colors, is determined not to be single color, while text images having a single color, such as black or red, are determined to be monochromatic.

If the determination unit 140 determines in S525 that the process region is not essentially monochromatic (S525: NO), the correction unit 160 advances to S560 without subjecting the process region to color correction. If the determination unit 140 determines that the process region is essentially monochromatic (S525: YES), in S530 the correction unit 160 converts the color system of the process region from the RGB color system to the YCbCr color system.

In S540 the correction unit 160 identifies and acquires the color values for the object image in the process region. Specifically, the correction unit 160 calculates the average pixel values (YCC values) of pixels used for calculating the variances described above, i.e., all pixels constituting the process region, excluding the near-background pixels, as the color values (TC_Y, TC_Cb, TC_Cr) of the object image.

In S545 the correction unit 160 identifies and acquires the background color value produced from the background color conversion process (hereinafter called the "current background color value"). That is, the correction unit 160 identifies a peripheral region in the converted image 60 that surrounds the process region and calculates the average values of pixels in the peripheral region as the current background color values (BC_Y2, BC_Cb2, BC_Cr2). The width of the peripheral region is set to the size of a prescribed pixel number (one pixel, for example).

In S550 the correction unit 160 executes a color correction process using all pixels of the process region as correction-target pixels. In other words, the correction-target pixels include a plurality of pixels constituting the object image, and a plurality of pixels constituting the border region MG. The correction unit 160 generates a color correction table using the color values (TC_Y, TC_Cb, TC_Cr) for the object image of the process region, and the current background color values (BC_Y2, BC_Cb2, BC_Cr2) for the background image surrounding the object image.

Figure 8A:
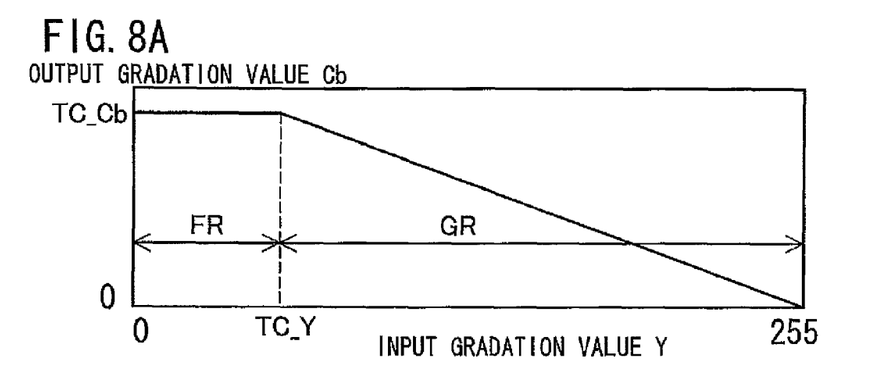
FIGS. 8A and 8B are graphs of a color correction table used when a background color is white.
Figure 8B:
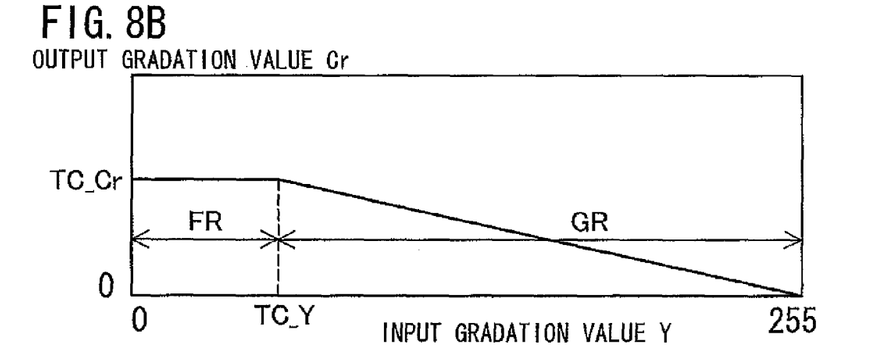
Figure 9A:
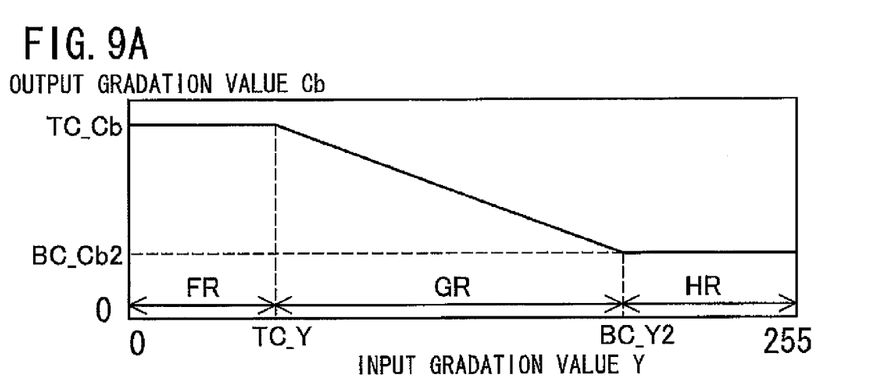
FIGS. 9A and 9B are graphs of a color correction table used when a background color is a color other than white.
Figure 9B:
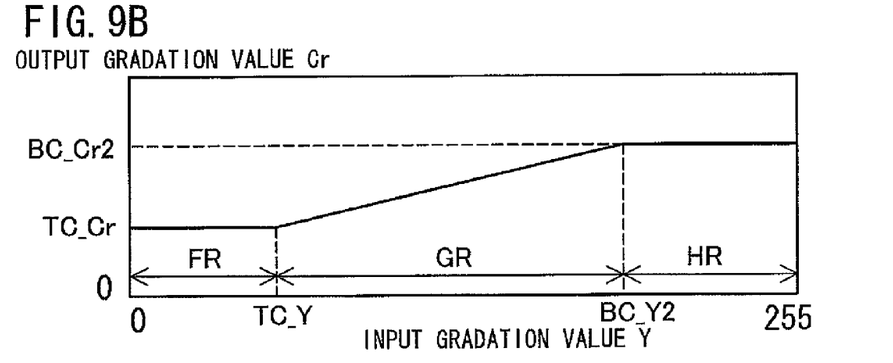

FIGS. 8 and 9 are graphs of sample color correction tables. The tables in FIG. 8 are used when the background color (BC_Y2, BC_Cb2, BC_Cr2) around the periphery of the process region is white (255, 0, 0). The tables in FIG. 9 are used when the background color around the periphery of the process region is a color other than white. FIGS. 8A and 9A show tables for correcting the chroma value Cb, while FIGS. 8B and 9B show tables for correcting the other chroma value Cr.

As shown in FIGS. 8 and 9, these color correction tables have luma values Y as input gradation values and chroma values Cb and Cr as output gradation values. The correction unit 160 references the luma value Y of the correction-target pixel in the color correction tables to acquire corrected chroma values Cb and Cr (corrected values). The correction unit 160 then changes the chroma values Cb and Cr of the correction-target pixel to the chroma values Cb and Cr acquired as the corrected values. The correction unit 160 does not modify the luma value Y of the correction-target pixel.

As shown in FIGS. 8 and 9, the corrected chroma values Cb and Cr are set to the chroma values TC_Cb and TC_Cr of the object image for a range FR in which the luma values Y of the correction-target pixel are lower than the luma value TC_Y of the object image. As shown in FIG. 9, the corrected chroma values Cb and Cr are also set to the chroma values BC_C2 and BC_Cr2 of the peripheral background image for a range HR in which the luma values Y of the correction-target pixels are greater than the BC_Y2 in the current background color values. When the current background color values represent white (BC_Y2=255), as in FIG. 8, the range HR does not exist.

The corrected chroma values Cb and Cr vary according to the luma value Y of the correction-target pixel within a range GR in which the luma values Y of the correction-target pixel are between the luma value TC_Y of the object image and the luma BC_Y2 of the current background color values. In other words, the corrected chroma values Cb and Cr within the range GR are set so as to approach the chroma values TC_Cb and TC_Cr of the object image as the luma value Y of the correction-target pixel nears the luma value TC_Y of the object image and to approach the chroma values BC_Cb2 and BC_Cr2 of the current background color values as the luma value Y nears the luma value BC_Y2 of the current background color values.

For example, the corrected chroma value Cb decreases monotonically as the luma value Y increases within the range GR when the chroma value TC_Cb of the object image is greater than the chroma value BC_Cb2 of the current background color values (FIGS. 8A and 9A). The corrected chroma value Cr increases monotonically as the luma value Y increases within the range GR when the chroma value TC_Cr of the object image is smaller than the chroma value BC_Cr2 of the current background color values (FIG. 9B).

The results of this color correction will be described next with reference to FIGS. 6A and 6B. As described earlier with reference to FIG. 6A, the luma values Y in the border region MG approach the luma value TC_Y of the object image as the pixel position in the border region MG approaches a position adjacent to the object image (the first position P1, for example) and approach the luma value BC_Y2 of the background image as the pixel position in the border region MG approaches a position adjacent to the background image (the second position P2, for example).

Hence, as a result of the color correction performed using the color correction table described above, the chroma value Cr in the border region MG has been corrected to approach the chroma value TC_Cr of the object image as the position in the border region MG approaches the object image and to approach the chroma value. BC_Cr2 of the background image as the pixel position nears the background image, as indicated by the chain line RC3 in FIG. 6B. In other words, the color of the border region MG is corrected to a corrected color based on the chroma values Cb and Cr and brightness values Y of both the object image and the background image. The corrected color is an intermediate color between the color of the object image and the color of the background image. Accordingly, even when unnatural colors are produced in the border region MG, the color correction described above can correct these unnatural colors to natural colors. Note, by setting the output gradation values (chroma values Cb and Cr) to a constant value within the range FR of the color correction table, it is possible to eliminate irregularities in chroma values Cb and Cr of a monochromatic object image, thereby reducing unevenness of color in the monochromatic object image.

In S555 the correction unit 160 converts the color system for the process region from the YCbCr color system to the RGB color system after the color correction process. In S560 the image process unit 100 determines whether all process regions have been selected in S505. If there remain process regions that have not been selected (S560: NO), the image process unit 100 returns to S505, selects a process region that has not yet been selected, and repeats the process in S505-S555 described above. When the image process unit 100 determines that all process regions have been selected (S560: YES), the image process unit 100 ends the color correction process of FIG. 7 and ends the image process of FIG. 2.

In the embodiment described above, the image process unit 100 corrects the colors in the border region MG to colors that approach the color of the object image and the color of the background image using the YCC values representing the color of the object image (characteristic values of the object), the YCC values representing the color of the background image (background characteristic values), and the luma values Y in the border region MG. In this way, the image process unit 100 can mitigate the unnaturalness of colors produced in the border region MG, thereby improving the image quality in the border region MG and the overall quality of the target image.

The image process unit 100 according to the embodiment also uses the background characteristic values BC_Cr2 and BC_Cb2 and the object characteristic values TC_Cr and TC_Cb to correct colors in the border region MG to colors having chroma values that fall between the chroma values of the object image and the chroma values of the background image. In this way, the image process unit 100 can suitably mitigate the unnaturalness of colors produced in the border region MG and can improve the image quality of the border region MG and the overall quality of the target image.

The image process unit 100 according to the embodiment also corrects colors in the border regions MG using the luma values Y of the border regions MG. Specifically, the image process unit 100 executes a color correction process to modify the chroma values Cb and Cr based on the luma value Y. This method achieves more appropriate results for subduing unnatural colors produced in the border region MG.

The image process unit 100 according to the embodiment executes color correction on the border region MG, not by modifying the luma values Y in the border region MG, but by modifying color values other than brightness values (specifically, the chroma values Cb and Cr). Thus, the image process unit 100 can mitigate the unnaturalness of colors in the border region MG while maintaining the tonality of the border region MG. This method can achieve a more natural-looking border region MG, improving the quality of the target image.

The image process unit 100 according to the embodiment also corrects the color values in the border region MG so that the color values approach those of the object image (specifically, chroma values TC_Cb and TC_Cr) as the luma value Y of the correction-target pixel nears the luma value Y of the object image. The image process unit 100 also corrects the color values in the border region MG so as to approach the color values of the background image (specifically, chroma values BC_Cb2 and BC_Cr2) as the luma value Y of the correction-target pixel nears the luma value Y of the background image. Accordingly, the image process unit 100 can easily correct the colors in the border region MG to natural colors transitioning smoothly from the object image to the background image.

In the embodiment, the determination unit 140 determines whether the object image currently being processed has the essentially-single color. The correction unit 160 corrects each process region that includes an object image determined to be essentially monochromatic (single color) by the determination unit 140, and the border region MG between this object image and the neighboring background image by sequentially selecting each of the plurality of pixels constituting the process region as a correction-target pixel. In some situations, it can be difficult to differentiate the object image from the border region MG with precision. However, the image process unit 100 according to the embodiment can easily correct colors in the border region MG to natural colors without differentiating the object image from the border region MG.

As described above, unnatural colors are sometimes produced in the border region MG between an object image and background image when executing the background color conversion process. The image process unit 100 according to the preferred embodiment can improve the image quality in the border region MG by mitigating unnatural colors in the border region MG that were introduced into the image data during the background color conversion process. The identification unit 150 identifies process regions by labeling each pixel as one of a converted background pixel, a preserved background pixel, and an object related pixel. In other words, regions having a plurality of contiguous object-related pixels are likely to include an object image. Hence, the identification unit 150 can identify process regions in need of correction easily and appropriately.

Since those process regions that are adjacent to converted background pixels are targeted for color correction while those adjacent to preserved background pixels are not, the image process unit 100 can selectively correct the process regions that have a greater need for correction. This method can reduce the required image processing time and process load.

As the background color conversion process is executed independently for each color component in the embodiment described above, the color of the background image can be modified to a variety of colors. In spite of this, the image process unit 100 of the embodiment can still mitigate unnatural colors produced in the border regions MG of the image, improving the image quality in these border regions MG.

The color correction tables described in the embodiment (FIGS. 8 and 9) are configured to set chroma values Cb and Cr to constant values within the range FR of gradation values smaller than the luma value TC_Y of the object image. In this way, the color correction process can suppress variations in hue and saturation produced in a monochromatic (single color) object image, thereby improving not only the image quality of the border region MG, but also the quality of the monochromatic object images.

Variations of the Embodiment (1) In the above-described embodiment, the image process unit 100 corrects colors in the border region MG to colors having chroma values between the chroma values of the object image and the chroma values of the background image, but the border region MG may be corrected to other colors, as well. However, the colors resulting from correction are preferably intermediate colors that fall between the colors of the object image and background image. An intermediate color between a first color and a second color is a color that, when expressed in the color space used to identify the first and second colors, has at least one component value in the color space that falls between (i.e., is an intermediate value of) the same component values of the first color and second color.

For example, when the unnatural quality of color in the border region MG is caused by hue and saturation, as described in the embodiment, the component values representing hue and saturation in the applicable color system are preferably corrected to intermediate values. Generally, the component values related to hue and saturation are different from a luma value in color systems including a luminance component (any value that represents the brightness of the color, called "lightness" in some color systems). In addition to the chroma values Cb and Cr in the YCbCr color system described in the embodiment, examples of component values related to hue and saturation include Pb and Pr values in the YPbPr color system, a* and b* values in the CIELAB color system, and hue and saturation values in the HSB color system. Further, intermediate colors between the first and second colors include points on a line segment connecting the position of the first color to the position of the second color in the color space when the intermediate color is expressed using the color system for identifying the first and second colors.

In the above-described embodiment, the luma values Y in the border region MG are intermediate values prior to correction (see FIG. 6A) and the chroma values Cb and Cr are corrected to intermediate values so that the colors in the border region MG are corrected to intermediate colors in which all three component values (Y, Cb, and Cr) are intermediate values. Hence, the colors in the border region MG are preferably corrected to intermediate colors in which a plurality of component values in the applicable color system are intermediate values, and more preferably corrected to intermediate colors in which all component values are intermediate values.

(2) While the colors of the border region MG are corrected so that the chroma values approach both the chroma values of the object image and background image in the above-described embodiment, the present invention is not limited to this method, provided that the colors are corrected to approach at least one of the object image color and background image color. The image process unit 100 according to the above-described embodiment uses characteristic values related to the color of the object image (and specifically YCC values), background characteristic values related to the color of the background image (and specifically YCC values), and the luma values Y of the border region MG in order to correct the colors of the border region MG so that the colors approach at least one of the object image color and background image color, but it is not necessary to use all three of the above values for correcting colors in the border region MG.

For example, the image process unit 100 may correct the border region MG using a combination of characteristic values related to the color of the object image and the luma values Y in the border region MG or a combination of characteristic values related to the color of the background image and the luma values Y in the border region MG. When the object image is a text image, for example, the text tends to appear thick as the colors in the border region MG approach the color of the text image and to appear thin as the colors in the border region MG approach the color of the background image. Accordingly, the colors in the border region MG of a character image may be adjusted so as to approach either the background image color or the text image color according to the format of the character in the text image and the user's preference. In this case, the border region MG is corrected using characteristic values related to whichever of the background image color or the text image color that the colors of the border region MG are to approach, and the luma values Y of the border region MG.

Here, the definition of correcting a first color so as to approach a second color includes the meaning of modifying component values of the first color so that the difference between the values of at least one component of the first color and the same component of the second color is smaller than the difference prior to correction, when both the first and second colors are expressed in a specific color system. In this method, it is also preferable to modify component values of the first color so that the difference in component values is not greater than the difference prior to correction for any component.

The definition of correcting the first color so as to approach the second color also includes the meaning of modifying component values of the first color so that the Euclidean distance between the first and second colors in the color space used to represent these colors grows shorter.

(3) Unlike the example given in the embodiment, the target image data may also be image data expressing an image whose dark and light regions have been reversed, i.e., whose object images are rendered in relatively light colors (colors with relatively large RGB values) and whose background images are rendered in relatively dark colors (colors with relatively small RGB values). In this case, the background color conversion process would be performed to convert the relatively dark colors to black ((R, G, B)=(0, 0, 0)), for example. This background color conversion process would employ a color conversion table different from the color conversion table RT in FIG. 4. For example, the color conversion table would be configured to modify all output gradation values Vout to the minimum gradation value (0) as the input gradation value Vin changes within a prescribed range of low gradation values (for example, within the range $0 \leq Vin < THa$) and to maintain the output gradation values Vout at the same gradation value as the input gradation value Vin changes within a prescribed range of high gradation values (for example, the range $THb < Vin \leq 255$). In this case, the color conversion table may be configured so that the output gradation values Vout are not discontinuous in response to changes in the input gradation values Vin within the range ($THa \leq Vin \leq THb$).

When correcting colors of an image whose highlights and shadows are reversed, color correction tables different from those in FIGS. 8 and 9 should be used. For example, the color correction table sets the chroma values Cr and Cb of the correction-target pixel to values equivalent to the chroma values TC_Cr and TC_Cb of the object image when the luma value Y of the border region MG is greater than the luma value TC_Y of the object image (assuming a relatively large value, such as the luma value 255 corresponding to white). This color correction table is further configured such that the chroma values Cr and Cb of the correction-target pixel are set to a value equivalent to the chroma values BC_Cr2 and BC_Cb2 of the background image when the luma value Y of the border region MG is smaller than the luma value BC_Y2 of the background image (assuming a relatively small value, such as the luma value 0 corresponding to black). The color correction table is further configured such that the chroma values Cr and Cb of the correction-target pixel approach the chroma values TC_Cb and TC_Cr of the object image as the luma value Y of the correction-target pixel nears the luma value TC_Y of the object image and approaches the chroma values BC_Cb2 and BC_Cr2 of the background image as the luma value Y nears the luma value BC_Y2 of the background image when the luma value Y of the border region MG is within the range BC_Y2≤Y≤TC_Y. This color correction eliminates unnatural colors produced in the border regions MG of an image whose dark and light areas have been reversed, improving the quality of a reversed image.

(4) The characteristic values related to the color of the object image in the above-described embodiment are averages of the YCC values for the pixels constituting the object image. However, these characteristic values may instead be the medians or modes of the YCC values, or any statistic (average, median, mode, etc.) calculated using some or all component values of the color expressed in a different color system.

(5) While the above-described embodiment includes the background color conversion process in the image process, this background color conversion process may be excluded. Further, the image process need not be executed by the multifunction peripheral 200 as described in the embodiment, but may be implemented on a personal computer, server, or other device. For example, a personal computer may acquire scan data that has undergone the background color conversion process from a scanner and may perform the image process, excluding the background color conversion process, on the acquired scan data.

(6) In the above-described embodiment, the identification unit 150 identifies those pixels in background images whose values were not modified in the background color conversion process as preserved background pixels and identifies those pixels whose values were modified in the background color conversion process as converted background pixels. However, the identification unit 150 may instead identify pixels as preserved background pixels when the amount of change in pixel values effected by the background color conversion process is no greater than 5 and may identify pixels as converted background pixels when the amount of change in pixel values is 6 or greater. In other words, the identification unit 150 may identify preserved background pixels to be those pixels having values whose difference before and after the background color conversion process does not exceed a reference value and may identify converted background pixels to be those pixels having values whose difference before and after the background color conversion process is greater than the reference value. In this way, the identification unit 150 can appropriately identify preserved background pixels and converted background pixels when the background image is essentially white but has some irregularity in color that effects change in pixel values during the background color conversion process.

(7) In the above-described embodiment, the background color conversion process is executed independently for each pixel component, but need not be. For example, the image process unit 100 may change the color of a pixel to white only when all RGB component values of the pixel fall within the range CR in FIG. 4 and not change the color of a pixel (modify the pixel values) when even one of the RGB component values falls outside the range CR. In this case, the resulting color of background images modified in the background color conversion process is limited to white, thereby eliminating the need to identify the background color values in S545 of FIG. 7. However, the color of pixels converted in the background color conversion process need not be white, but may another color, such as light yellow. In this case, unnatural colors in the border region MG can still be corrected appropriately using suitable color correction tables (see FIG. 9) based on the converted background color.

(8) Part of the configuration implemented in hardware in the above-described embodiment may be replaced with software and, conversely, part of the configuration implemented in software in the embodiment may be replaced with hardware.

What is claimed is:

1. An image processing device comprising:
a processor; and
a memory storing computer-readable instructions therein, the computer-readable instructions, when executed by the processor, causing the image processing device to perform:
acquiring image data indicative of an image including an object image and a background image adjacent to the object image, the object image and the background image defining a border region in a border of the object image and the background image, the border region having color data representing the color of the border region, the color data including a brightness value and a color value different from the brightness value;
acquiring at least two of a first characteristic value, a second characteristic value, and a brightness of the border region, the first characteristic value relating to a color of the object image, the second characteristic value relating to a color of the background image; and
correcting the color value of the border region by using the at least two of the first characteristic value, the second characteristic value, and the brightness of the border region while the brightness value is not corrected;
wherein the first characteristic value includes a first brightness value and a first color value, the first brightness value indicating brightness of the object image, the first color value indicating a color component of the object image;
wherein the second characteristic value includes a second brightness value and a second color value, the second brightness value indicating brightness of the background image, the second color value indicating a color component of the background image;
wherein the image processing device further performs:
determining a plurality of to-be-corrected pixels including pixels in the border region, each of the plurality of to-be-corrected pixels having: a color value indicating a color component of the to-be-corrected pixel; and a brightness value indicating a brightness of the to-be-corrected pixel;

correcting the color value of each of the plurality of to-be-corrected pixels to a corrected color value such that:
  if the brightness value of the to-be-corrected pixel is a value between the first brightness value and the second brightness value, the corrected color value is set closer to the first color value as the brightness value of the to-be-corrected pixel is closer to the first brightness value; and
  if the brightness value of the to-be-corrected pixel is a value between the first brightness value and the second brightness value, the corrected color value is set closer to the second color value as the brightness value of the to-be-corrected pixel is closer to the second brightness value.

2. The image processing device according to claim 1, wherein the first characteristic value and the second characteristic value are acquired;
  wherein the color value of the border region is corrected to a corrected color value by using the first characteristic value and the second characteristic value, the corrected color value being defined as an intermediate color between the color of the object image and the color of the background image.

3. The image processing device according to claim 2, wherein the first characteristic value, the second characteristic value, and the brightness of the border region are acquired;
  wherein the color value of the border region is corrected to the corrected color value by using the first characteristic value, the second characteristic value, and the brightness of the border region.

4. The image processing device according to claim 1, wherein the brightness of the border region and one of the first characteristic value and the second characteristic value are acquired;
  wherein the color value of the border region is corrected by shifting the color value of the border region in a direction toward the color of the object image if the first characteristic value is acquired;
  wherein the color value of the border region is corrected by shifting the color value of the border region in a direction toward the color of the background image if the second characteristic value is acquired.

5. The image processing device according to claim 1, further performing
  determining whether or not the object image is essentially represented by a single color;
  wherein all pixels included in the object image essentially represented by the single color and in the border region defined by the object image essentially represented by the single color and the background image are determined as the to-be-corrected pixels.

6. A non-transitory computer readable storage medium storing a set of program instructions executed by a computer, the program instructions comprising:
  acquiring image data indicative of an image including an object image and a background image adjacent to the object image, the object image and the background image defining a border region in a border of the object image and the background image, the border region having color data representing the color of the border region, the color data including a brightness value and a color value different from the brightness value;
  acquiring at least two of a first characteristic value, a second characteristic value, and a brightness of the border region, the first characteristic value relating to a color of the object image, the second characteristic value relating to a color of the background image; and
  correcting the color value of the border region by using the at least two of the first characteristic value, the second characteristic value, and the brightness of the border region while the brightness value is not corrected;
  wherein the first characteristic value includes a first brightness value and a first color value, the first brightness value indicating brightness of the object image, the first color value indicating a color component of the object image;
  wherein the second characteristic value includes a second brightness value and a second color value, the second brightness value indicating brightness of the background image, the second color value indicating a color component of the background image;
  wherein the program instructions further comprise:
    determining a plurality of to-be-corrected pixels including pixels in the border region, each of the plurality of to-be-corrected pixels having: a color value indicating a color component of the to-be-corrected pixel; and a brightness value indicating a brightness of the to-be-corrected pixel;
    correcting the color value of each of the plurality of to-be-corrected pixels to a corrected color value such that:
      if the brightness value of the to-be-corrected pixel is a value between the first brightness value and the second brightness value, the corrected color value is set closer to the first color value as the brightness value of the to-be-corrected pixel is closer to the first brightness value; and
      if the brightness value of the to-be-corrected pixel is a value between the first brightness value and the second brightness value, the corrected color value is set closer to the second color value as the brightness value of the to-be-corrected pixel is closer to the second brightness value.

7. An image processing method executed by an image processing device, the image processing method comprising:
  acquiring, with the image processing device, image data indicative of an image including an object image and a background image adjacent to the object image, the object image and the background image defining a border region in a border of the object image and the background image, the border region having color data representing the color of the border region, the color data including a brightness value and a color value different from the brightness value;
  acquiring at least two of a first characteristic value, a second characteristic value, and a brightness of the border region, the first characteristic value relating to a color of the object image, the second characteristic value relating to a color of the background image; and
  correcting the color value of the border region by using the at least two of the first characteristic value, the second characteristic value, and the brightness of the border region while the brightness value is not corrected;
  wherein the first characteristic value includes a first brightness value and a first color value, the first brightness value indicating brightness of the object image, the first color value indicating a color component of the object image;
  wherein the second characteristic value includes a second brightness value and a second color value, the second brightness value indicating brightness of the background image, the second color value indicating a color component of the background image;

wherein the image processing method further comprises:

determining a plurality of to-be-corrected pixels including pixels in the border region, each of the plurality of to-be-corrected pixels having: a color value indicating a color component of the to-be-corrected pixel; and a brightness value indicating a brightness of the to-be-corrected pixel;

correcting the color value of each of the plurality of to-be-corrected pixels to a corrected color value such that:

if the brightness value of the to-be-corrected pixel is a value between the first brightness value and the second brightness value, the corrected color value is set closer to the first color value as the brightness value of the to-be-corrected pixel is closer to the first brightness value; and if the brightness value of the to-be-corrected pixel is a value between the first brightness value and the second brightness value, the corrected color value is set closer to the second color value as the brightness value of the to-be-corrected pixel is closer to the second brightness value.

* * * * *